(12) United States Patent
Wang

(10) Patent No.: US 8,998,242 B2
(45) Date of Patent: Apr. 7, 2015

(54) DUAL-PURPOSE SAFETY BABY CARRIER

(71) Applicant: Beto Engineering and Marketing Co., Ltd., Taichung (TW)

(72) Inventor: Lopin Wang, Taichung (TW)

(73) Assignee: Beto Engineering and Marketing Co., Ltd., Taichung (TW)

( * ) Notice: Subject to any disclaimer, the term of this patent is extended or adjusted under 35 U.S.C. 154(b) by 50 days.

(21) Appl. No.: 13/831,402

(22) Filed: Mar. 14, 2013

(65) Prior Publication Data

US 2014/0265255 A1    Sep. 18, 2014

(51) Int. Cl.
| | |
|---|---|
| *B62B 7/10* | (2006.01) |
| *B62B 7/06* | (2006.01) |
| *B62B 7/12* | (2006.01) |
| *B60N 2/28* | (2006.01) |

(52) U.S. Cl.
CPC ... *B62B 7/06* (2013.01); *B62B 7/12* (2013.01); *B60N 2/2848* (2013.01); *B62B 7/10* (2013.01)

(58) Field of Classification Search
CPC ............ B62B 7/10; B62B 7/105; B62B 7/12; B60N 2/2848
USPC ........... 280/30, 642, 643, 647, 648, 650, 657, 280/658
See application file for complete search history.

(56) References Cited

U.S. PATENT DOCUMENTS

| | | | | |
|---|---|---|---|---|
| 4,874,182 | A * | 10/1989 | Clark | 280/30 |
| 5,104,134 | A * | 4/1992 | Cone | 280/30 |
| 5,385,386 | A * | 1/1995 | Beamish et al. | 297/256.16 |
| 5,707,106 | A * | 1/1998 | Clark | 297/130 |
| 6,237,995 | B1 * | 5/2001 | Dierickx | 297/130 |
| 6,306,066 | B1 * | 10/2001 | Yang | 482/68 |
| 6,443,479 | B2 * | 9/2002 | Huang | 280/642 |
| 6,478,328 | B1 * | 11/2002 | Yeh et al. | 280/650 |
| 6,910,709 | B2 * | 6/2005 | Chen | 280/642 |
| 2008/0007097 | A1 * | 1/2008 | Aliev | 297/130 |

* cited by examiner

*Primary Examiner* — Frank Vanaman
(74) *Attorney, Agent, or Firm* — Leong C. Lei

(57) ABSTRACT

A dual-purpose safety baby carrier includes a seat having armrests and a bottom to which a cover defining a receiving chamber is mounted. Upper and lower positioning sections are mounted to a back of the seat. A control bar is movable along the upright tubes between a position where a push key of a safety switch engages the upper positioning section to allow a wheel frame carrying wheels to be retracted into the receiving chamber for serving as a safety seat and a position where the push key engages the lower positioning section to allow the wheel frame to be expanded to form a stroller. The safety switch also includes a push button biased by a spring for locking the push key in position of engaging the upper or lower positioning section. A securing structure includes coupling members mounted to the seat for coupling a seat belt.

7 Claims, 11 Drawing Sheets

DUAL-PURPOSE SAFETY BABY CARRIER

(a) TECHNICAL FIELD OF THE INVENTION

The present invention generally relates to a dual-purpose carrier that can be used as a safety seat or a stroller, and more particularly to a carrier that comprises a push button for normally maintaining a push key in a locked condition so that conversion between the safety seat and the stroller can only be done with the push key unlocked by operating the push button thereby providing dual safety protections.

(b) DESCRIPTION OF THE PRIOR ART

Traffic regulations are stipulated for young babies of ages one to four must be accommodated in a safety seat when seated on the back seat of a passenger car. However, the conventional safety seats can not be converted into a stroller and thus, parents must additionally purchase a stroller to transportation of the young baby. This occupies additional space of the car and also takes additional expense. The present inventor thus discloses in Chinese Utility Model Application No. 200420104959 a device for handling such problems. Such a device is collapsible into a seat or can be selectively expanded to form a stroller. However, in the progress of commercialization, certain shortcomings are found:

(1) When the device is expanded as a stroller, a push button may get released due to accidental actuation or vibration caused by car movement, leading to immediate corruption of the entire structure. This may scare the baby sitting therein or may even hurt the baby.

(2) When the device is used as a seat, no safety belt is provided for fixing the baby. Thus, it can be used as a regular seat. This imposes a limitation to the functionality thereof.

In view of these shortcomings, the present invention aims to provide a device to overcome these problems.

SUMMARY OF THE INVENTION

The disclosure of the present invention provides a dual-purpose safety baby carrier that is selectively convertible into a safety seat or a stroller and comprises:

a seat, which has left and right sides each provided with an armrest and has a bottom to which a cover is mounted, the cover defining therein a receiving chamber, the seat having a back to which an upper positioning section and a lower positioning section are mounted;

a support assembly, which comprise parallel upright tubes mounted to the back of the seat and a handle for use in a stroller configuration thereof;

a control bar, which extends between the two upright tubes and is movable along the two upright tubes to a location corresponding to the upper positioning section or the lower positioning section, the control bar comprising a guide slot and a guide slot in communication with the compartment;

a safety switch, which comprises a push key slidably received in the compartment, the push key being biased by a first spring to extend out to selectively engage the upper positioning section or the lower positioning section, the safety switch comprising a push button slidably received in the guide slot, the push button being biased by a second spring to selectively lock the push key, whereby when the push button is moved against the second spring to a predetermined location, the push key is unlocked to allow the push key to disengage from the upper positioning section or the lower positioning section;

a wheel frame, which is coupled between the seat and the control bar, whereby when the control bar is moved upward to have the push key engage the upper positioning section, the wheel frame is retractable into the receiving chamber and the back of the seat to form a configuration of safety seat and when the control bar is moved downward to have the push key engage the lower positioning section, the wheel frame is expandable to form a configuration of stroller; and a securing structure, which comprises first coupling members respectively mounted to the two armrests and second coupling members mounted to the back of the seat, the first and second coupling members each forming an engagement slot to receive and couple a seat belt.

Thus, the present invention provides at least the following advantages:

(1) The present invention provides a push key that uses a push button to lock the push key in position so that the push key is not allowed to release the engagement thereof with an upper positioning section or a lower positioning section; to release the engagement, the push button must be first moved to a predetermined location in order to allow the push key to be operated for release from the upper positioning section or the lower positioning section. Such a dual safety protection arrangement effectively eliminates the risk of the push key being accidentally actuated or being activated by vibration caused by vehicle movement.

(2) The present invention provides a securing structure that is additionally mounted to provide a use as a safety seat for the purposes of further improving the function of the known devices.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

Figure 1:
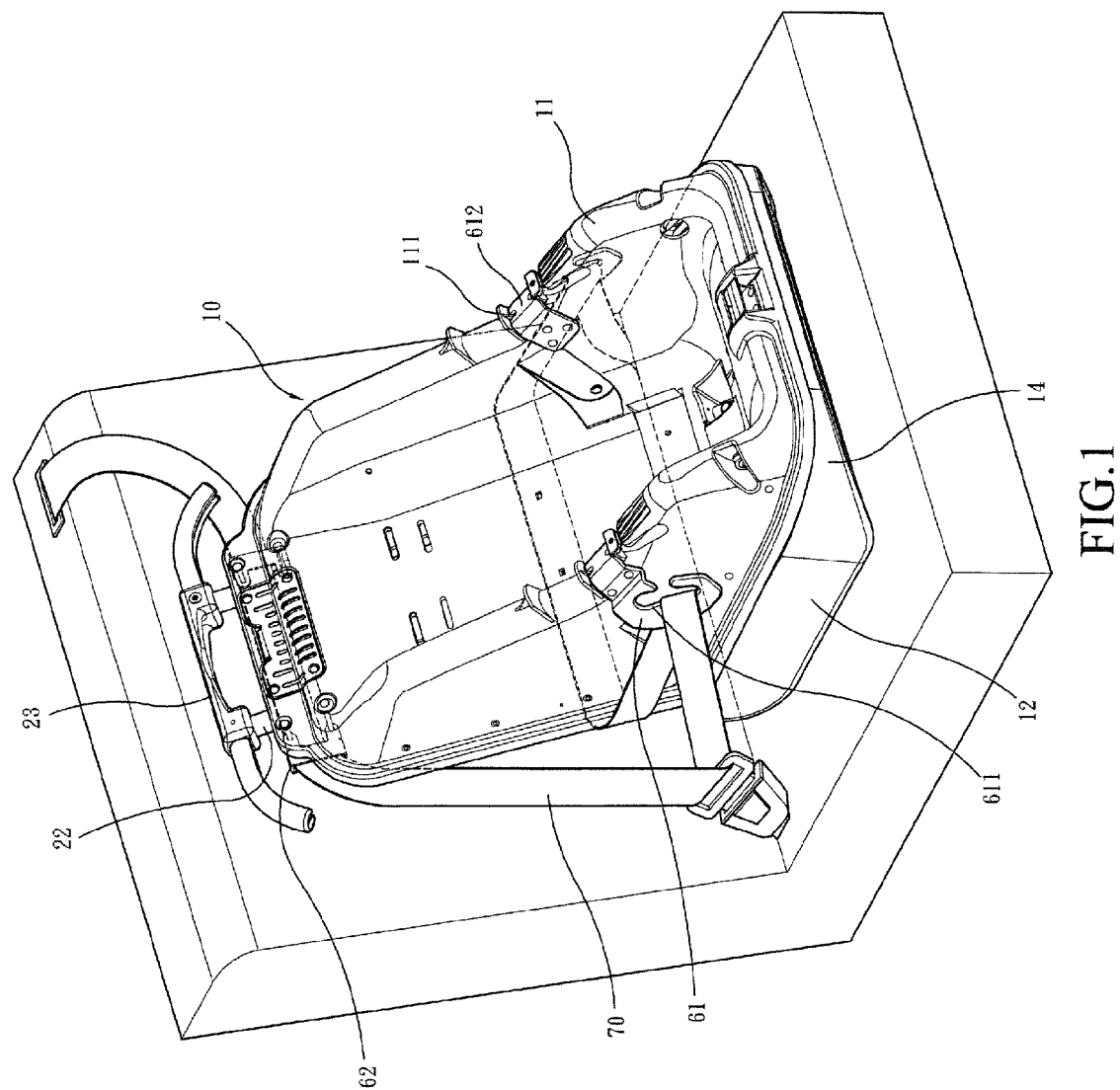
FIG. 1 is a perspective view showing the present invention set in the form of a safety seat.
Figure 2:
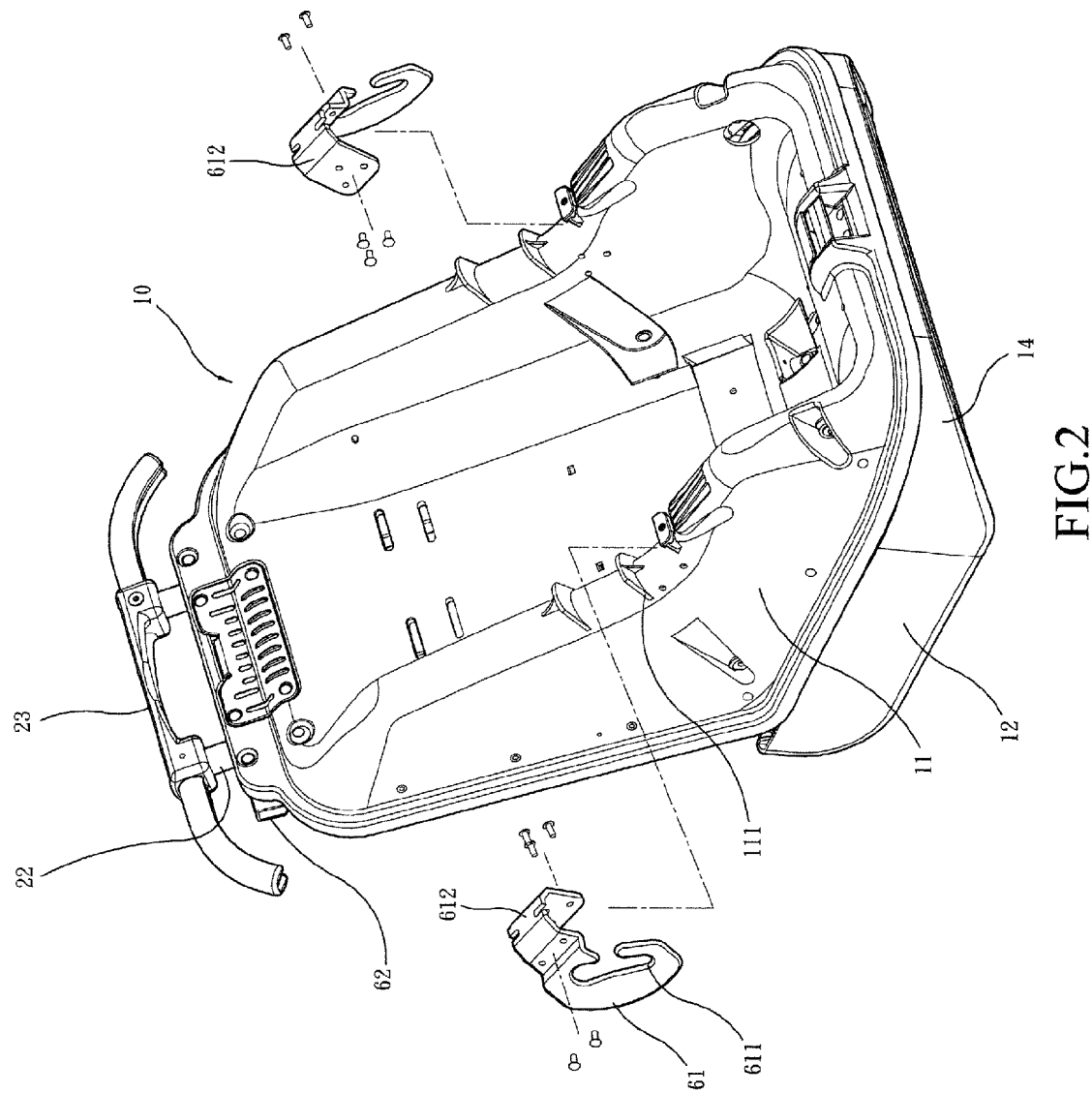
FIG. 2 is a perspective view showing the arrangement of a securing structure of the present invention.
Figure 3:
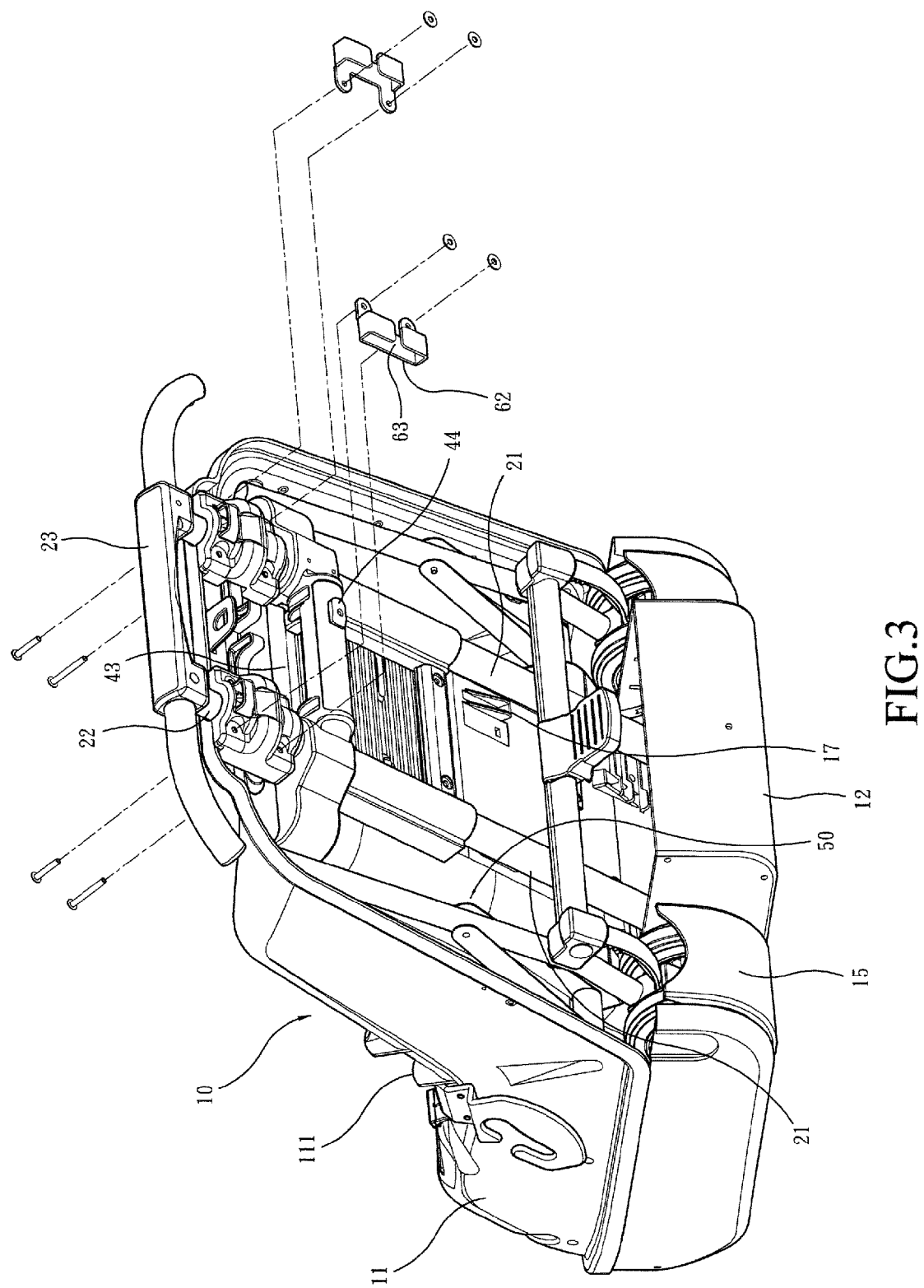
FIG. 3 is another perspective view showing the arrangement of a securing structure of the present invention.
Figure 4:
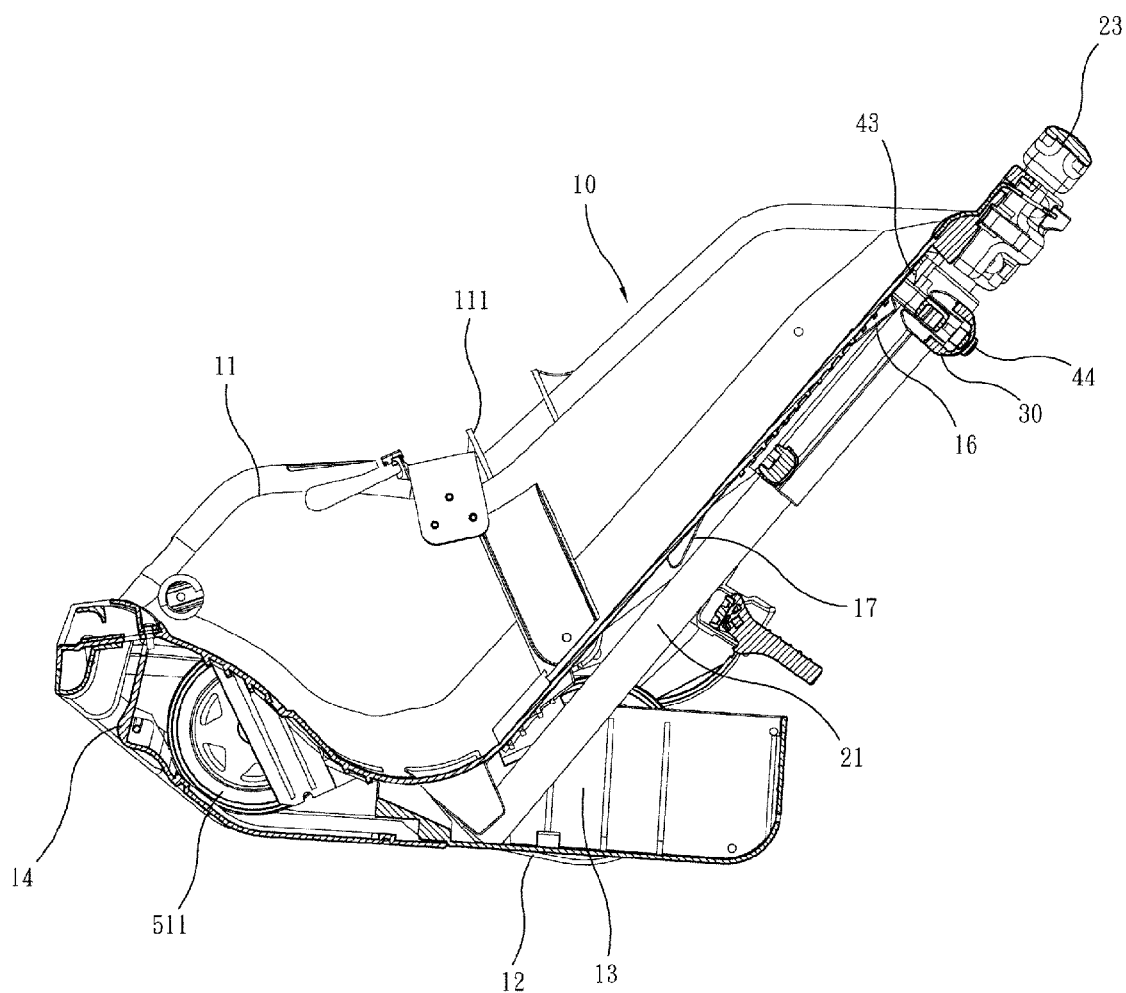
FIG. 4 is a cross-sectional view of the present invention set in the form of a safety seat.
Figure 5:
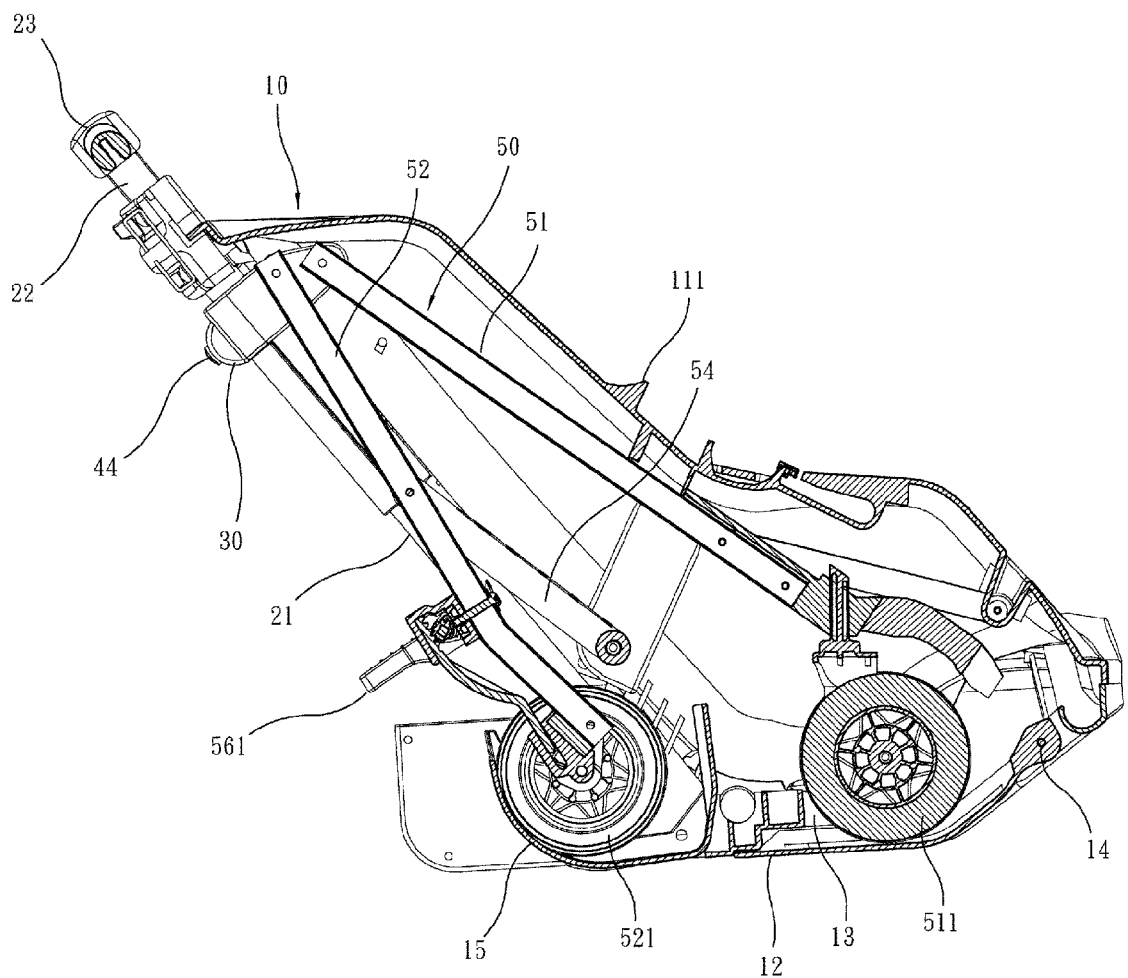
FIG. 5 is another cross-sectional view of the present invention set in the form of a safety seat.
Figure 6:
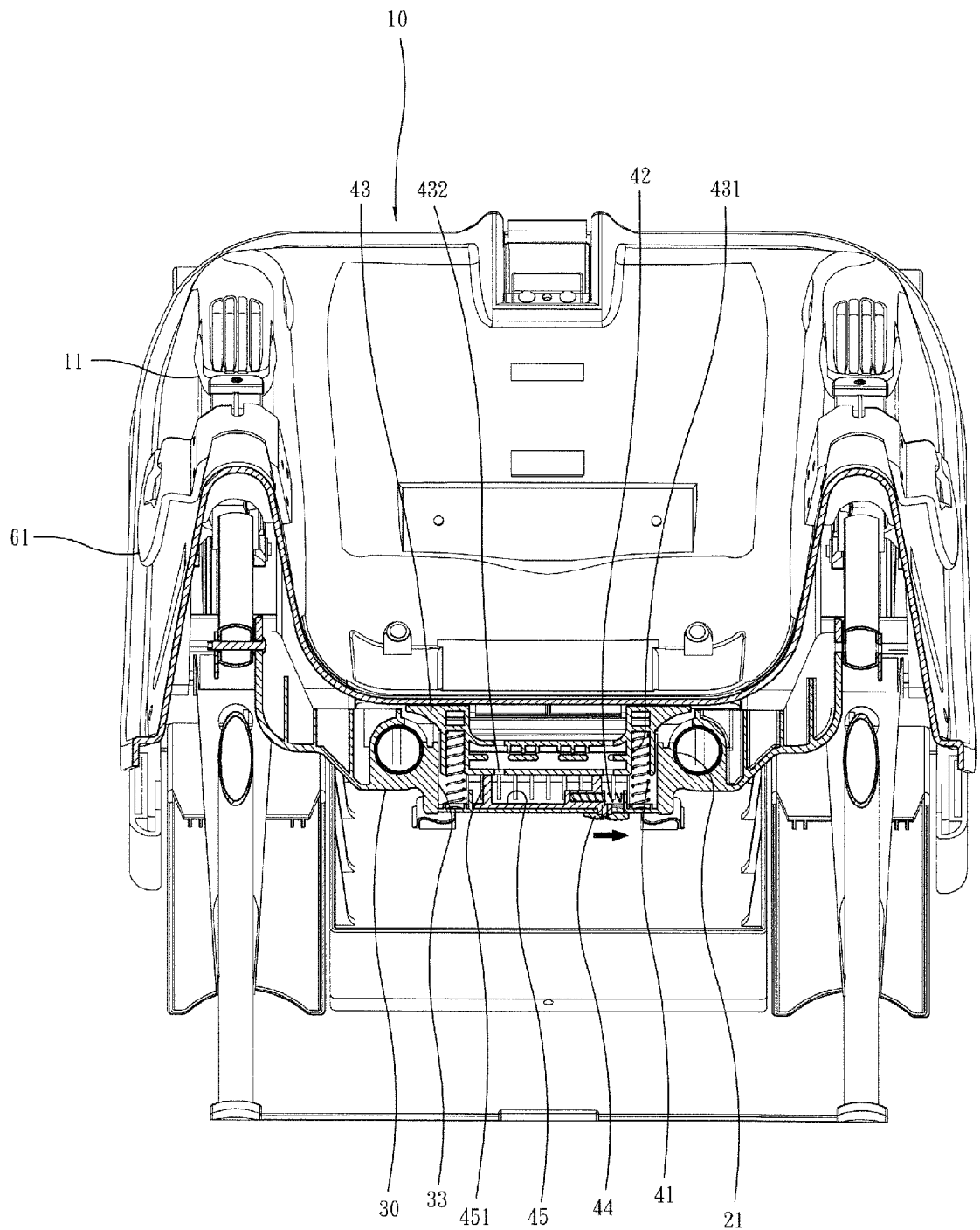
FIG. 6 is a schematic view illustrating an operation of a safety switch according to the present invention.
Figure 7:
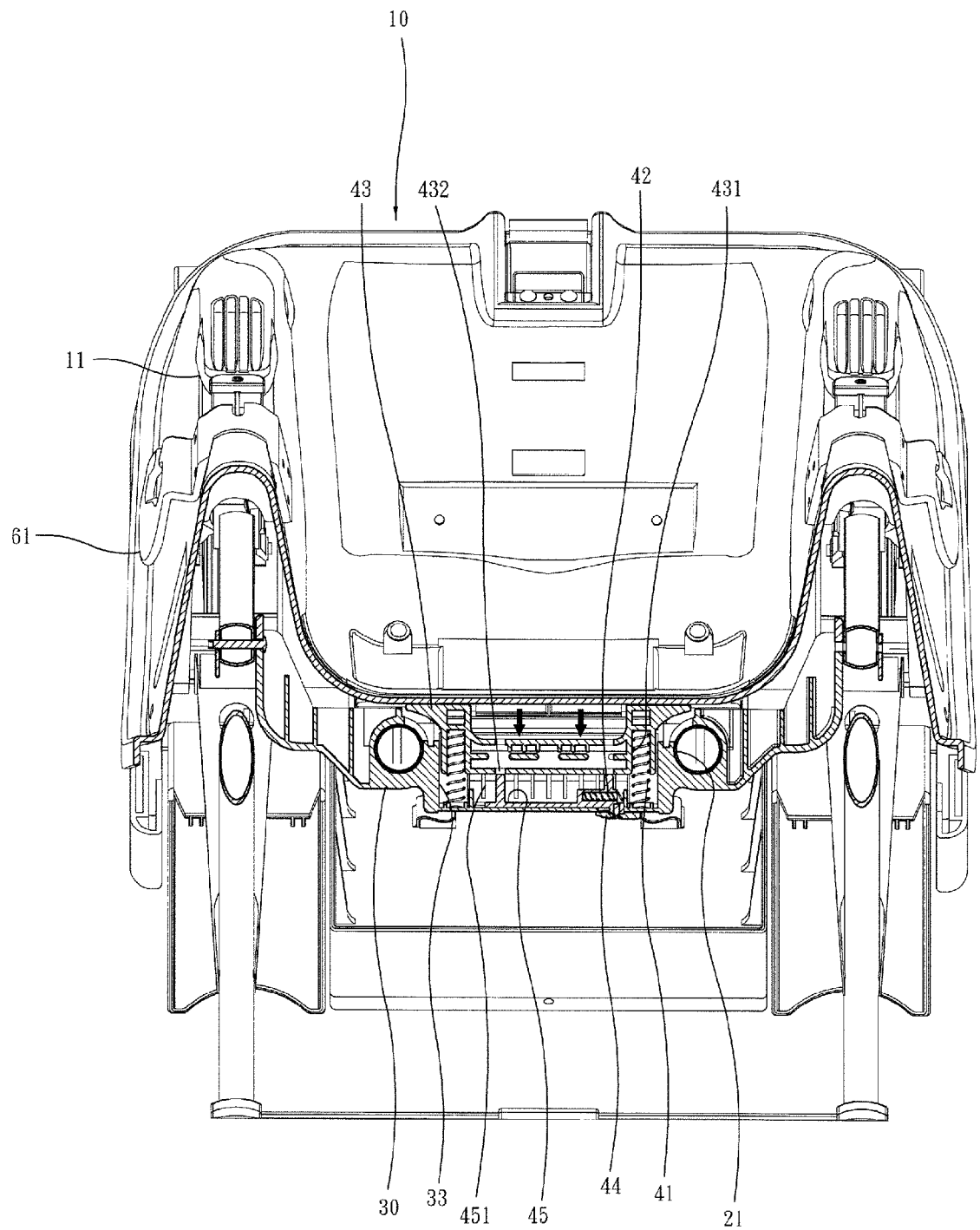
FIG. 7 is another schematic view illustrating an operation of a safety switch according to the present invention.
Figure 8:
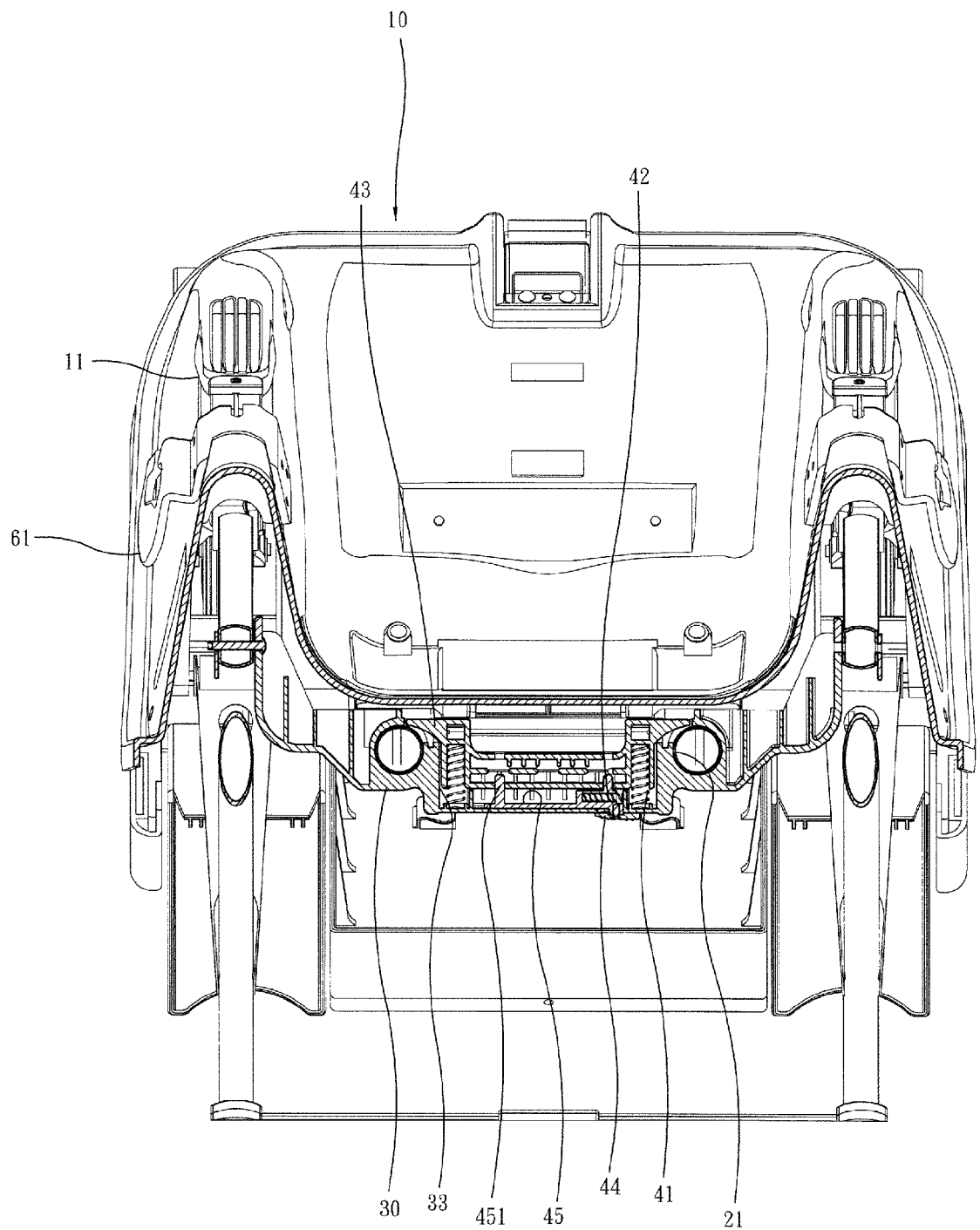
FIG. 8 is still another schematic view illustrating an operation of a safety switch according to the present invention.

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Referring to FIGS. 1-11, the present invention provides a dual-purpose safety baby carrier, which can be used as a safety seat or a stroller and comprises the following component.

A seat 10 has left and right sides each provided with an armrest 11. The armrest 11 has a top to which two raised retention plates 111 that are spaced from each other are mounted. The seat 10 has a bottom to which a cover 12 is mounted. The cover 12 has a front end edge to which a front lid 14 is pivotally connected and a rear end edge that has opposite lateral sides to each of which a rear lid 15 is pivotally connected. The cover 12, the front lid 14, and the rear lid 15 collectively define an openable/closable receiving chamber 13. The cover 12 further comprises an upper positioning section 16 and a lower positioning section 17 that correspond to each other in an up-down direction and formed on a back of the seat 10. The upper positioning section 16 and the lower positioning section 17 are of a wedge shape.

A support assembly comprises two parallel upright tubes 21 mounted to the back of the seat 10. The two upright tubes 21 are each slidably coupled with an inner tube 22 in such way that the two inner tubes 22 have top ends projecting beyond the upright tubes 21 and connected to a handle 23 bridging therebetween so that the handle 23 is extendible for use with a stroller or retractable for use with a safety seat.

A control bar 30 extends between the two upright tubes 21 and forms guide holes 31 respectively corresponding to and slidably receiving therethrough the two upright tubes 21 so as to be slidable along the two upright tubes 21 to a location corresponding to the upper positioning section 16 or the lower positioning section 17. The control bar 30 has an inner side that is adjacent to the seat 10 and is recessed to form a compartment 33. The control bar 30 also has an outer side that is recessed to form a guide slot 32 in communication with the compartment 33.

A safety switch comprises first springs 41, a second spring 42, a push key 43, a push button 44, and a slide block 45. The first springs 41 and the second spring 42 each have an end fixed in the compartment 33. The push key 43 has an end that is slidably fitting in the compartment 33 so as to do limited movement in a radial direction of the control bar 30, whereby an opposite end of the push key 43 may be extended/retracted to engage/disengage the upper positioning section 16 or the lower positioning section 17. The push key 43 has an end that is recessed to form spring receptacles 431 and first brake sections 432. The spring receptacles 431 respectively receive the other ends of the first springs 41 to assemble thereto so that the first springs 41 biases the opposite end of the push key 43 to be normally in an extended and engaging condition with respect to the upper positioning section 16 or the lower positioning section 17. The safety switch is further arranged to have the push button 44 slidably received in the guide slot 32 so that the push button 44 is allowed to do limited movement in an axial direction of the control bar 30. The compartment 33 slidably receives the slide block 45 therein. The slide block 45 is connected to the push button 44 and is provided with second brake sections 451 that mate the first brake sections 432. The slide block 45 is biased by an opposite end of the second springs 42 to keep the second brake sections 451 shifted away from the first brake section 432 and supporting the end of the push key 43 thereby retaining and locking the push key 43 in position and keeping the opposite end of the push key 43 in a condition of engaging the upper positioning section 16 or the lower positioning section 17. When the push button 44 is operated to move the slide block 45, by compressing the second spring 42, to a predetermined location, the second brake sections 451 are set corresponding to the first brake section 432 thereby unlocking, whereby with a user moving the push key 43 to compress the first springs 41, the opposite end of the push key 43 disengages from the upper positioning section 16 or the lower positioning section 17 so as to allow the overall configuration to be switched to a safety seat or a stroller.

Figure 9:
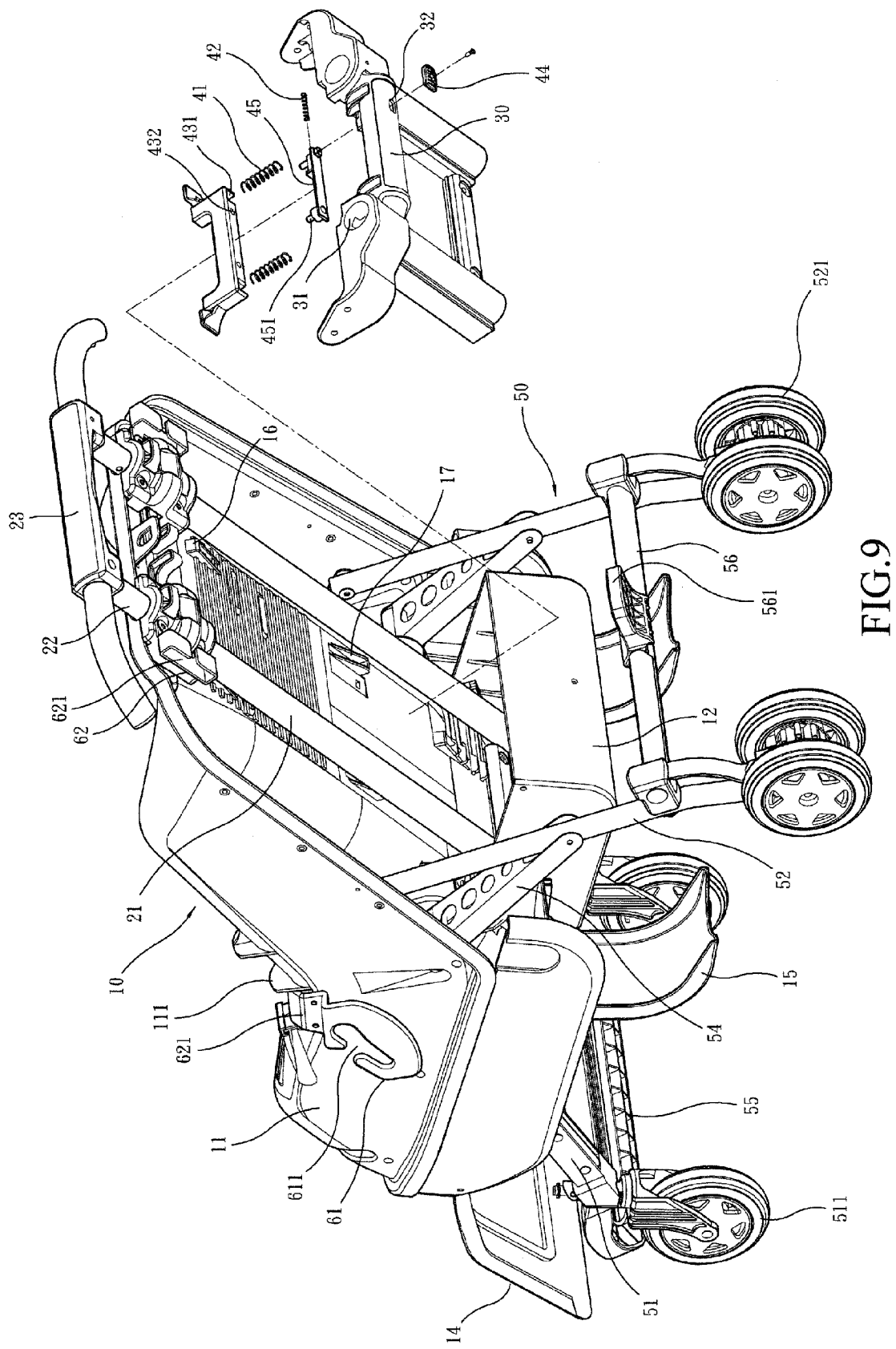
FIG. 9 is an exploded view showing the arrangement of the safety switch and a control bar of the present invention.
Figure 10:
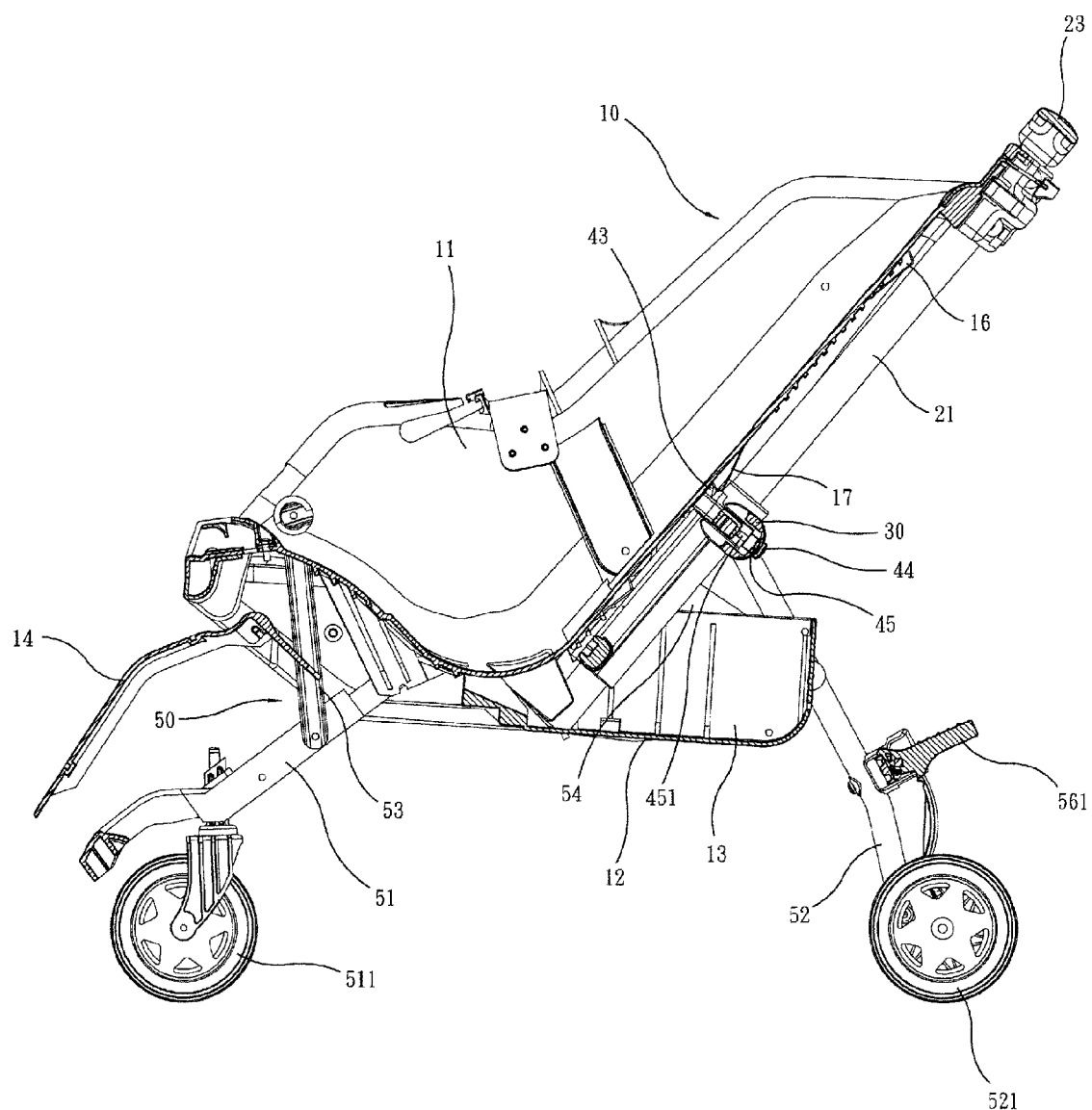
FIG. 10 is a cross-sectional view of the present invention set in the form of a stroller.
Figure 11:
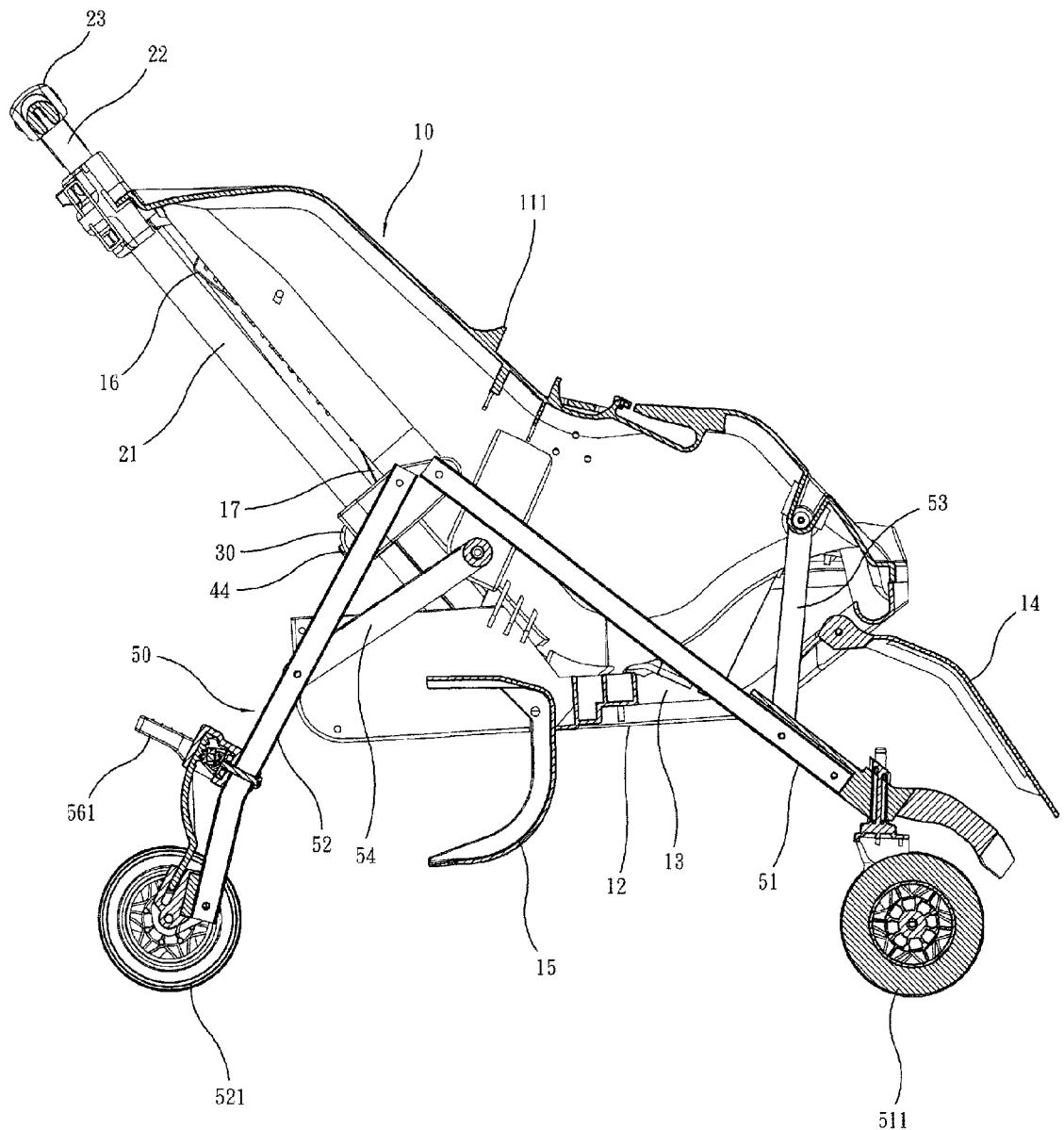
FIG. 11 is another cross-sectional view of the present invention set in the form of a stroller.

A wheel frame 50, which is particularly shown in FIGS. 9-11, is a known device. The wheel frame 50 is coupled between the seat 10 and the control bar 30, whereby when the control bar 30 is moved upward to a location corresponding to the upper positioning section 16, the wheel frame 50 is retracted into the receiving chamber 13 and the back of the seat 10 to form a configuration of safety seat, where the push key 43 engages the upper positioning section 16 to secure the safety seat configuration. On the other hand, when the control bar 30 is moved down to a location corresponding to the lower positioning section 17, the wheel frame 50 is allowed to expand to form a configuration of stroller, where the push key 43 is engageable with the lower positioning section 17 to secure the stroller configuration. Pivotally mounted to two lateral sides of the control bar 30 are front bars 51 and the rear bars 52 of the wheel frame 50, which are jointed at locations that are shifted from each other. Each of the front bars 51 has a lower end coupled to a front wheel 511 and each of the rear bars 52 has a lower end coupled to a rear wheel 521. Further, each of the front bars 51 has a middle section to which an end of a front brace 53 is pivoted and the front brace 53 has an opposite end pivoted to a front portion of the seat 10. Each of the rear bars 52 has a middle section to which an end of a rear brace 54 is pivoted and the rear brace 54 has an opposite end pivoted to a rear portion of the seat 10. To enhance stability of the wheel frame 50, a front cross bar 55 is provided to connect and bridge between the two front bars 51 and a rear cross bar 56 connects and bridges between the rear bars 52. In addition, a treading section 561 for easy application of force is attached to the rear cross bar 56.

A securing structure is provided and comprises two first coupling members 61 that are mounted outside the two armrests 11 and two second coupling members 62 that are symmetrically mounted to a top portion of the back of the seat 10. Each of the first coupling members 61 and the second coupling members 62 comprises a T-shaped engagement slot 611, 621 for hooking and coupling a seat belt. Each of the first coupling members 61 also comprise a hook 612 to directly fit, through downward movement, to the armrest 11 between the two retention plates 111. Bolting is then applied to securely mount the first coupling member 61.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A dual-purpose safety baby carrier, comprising:
    a seat, which has a bottom to which a cover is mounted to define therein a receiving chamber, the seat having a back on which an upper positioning section and a lower positioning section are mounted;
    a support assembly, which comprises two parallel upright tubes mounted to the back of the seat and a handle;
    a control bar, which is slidable with respect to the two upright tubes to selectively move to a location corresponding to the upper positioning section or the lower positioning section, the control bar comprising a guide slot and a guide slot in communication with a compartment;
    a safety switch, which is mounted to the control bar and comprises a push key slidably received in the compartment, the push key being biased by a first spring to extend out to selectively engage the upper positioning section or the lower positioning section, the safety switch comprising a push button slidably received in the guide slot, the push button being biased by a second spring to selectively lock the push key, whereby when the push button is moved against the second spring to a predetermined location, the push key is unlocked to allow the push key to overcome the first spring and release the engagement thereof with the upper positioning section or the lower positioning section;
    a wheel frame, which is coupled between the seat and the control bar, whereby when the control bar is moved upward to have the push key engage the upper positioning section, the wheel frame is retractable into the receiving chamber and the back of the seat to form a configuration of safety seat and when the control bar is moved downward to have the push key engage the lower positioning section, the wheel frame is expandable to form a configuration of a stroller;
    wherein the seat has left and right sides each provided with an armrest, each of the armrests having an outside surface to which a first coupling member is mounted, second coupling members being mounted to the back of the seat, the first and second coupling members each forming an engagement slot that is adapted to receive and couple a seat belt; each of the armrests has a top to which two raised retention plates that are spaced from each other are mounted, each of the first coupling members comprising a hook to directly fit, through a downward movement, to the corresponding armrest between the two retention plates and be bolted to securely fix the first coupling member.

2. The dual-purpose safety baby carrier according to claim 1, wherein each of the first spring and the second spring has an end fixed in the compartment, the push key having an end slidably received in the compartment to selectively do a limited movement in a radial direction of the control bar so as to allow an opposite end of the push key to extend/retract for engaging with/disengaging from the upper positioning section or the lower positioning section, the end of the push key being provided with a spring receptacle and a first brake section, the spring receptacle receiving and fixing therein an opposite end of the first spring, the push button being slidably received in the guide slot to selectively do limited movement in an axial direction of the control bar, the safety switch comprising a slide block slidably received in the compartment, the slide block being connected to the push button and comprising a second brake section that is mateable with the first brake section, the slide block being biased by an opposite end of the second spring to maintain the second brake section away from the first brake section and supporting the end of the push key, thereby retaining and locking the push key in position and keeping the opposite end of the push key in a condition of engaging the upper positioning section or the lower positioning section, whereby when the push button moves the slide block to compress the second spring and move to the predetermined location, the second brake section operates with the first brake section for unlocking.

3. The dual-purpose safety baby carrier according to claim 2, wherein the cover has a front end edge to which a front lid, is pivotally connected and a rear end edge that has opposite lateral sides to each of which a rear lid is pivotally connected, the cover, the front lid, and the rear lid collectively define the receiving chamber that is openable and closable.

4. The dual-purpose safety baby carrier according to claim 2, wherein the wheel frame comprises front bars and rear bars pivotally mounted to two lateral sides of the control bar, each of the front bars having a lower end coupled to a front wheel, each of the rear bars having a lower end coupled to a rear wheel, each of the front bars having a middle section to which an end of a front brace is pivoted, the front brace having an opposite end pivoted to a front portion of the seat, each of the rear bars having a middle section to which an end of a rear brace is pivoted, the rear brace having an opposite end pivoted to a rear portion of the seat.

5. The dual-purpose safety baby carrier according to claim 4, wherein a front cross bar is provided to connect between the two front bars and a rear cross bar connects between the rear bars, a treading section being attached to the rear cross bar.

6. The dual-purpose safety baby carrier according to claim 2, wherein the control bar extends between the upright tubes and comprises guide holes respectively corresponding to and slidably receiving therethrough the two upright tubes.

7. The dual-purpose safety baby carrier according to claim 2, wherein each of the two upright tubes is slidably coupled with an inner tube in such way that the inner tube has a top end projecting beyond a respective one of the upright tubes and connected to a handle bridging therebetween so that the handle is extendible for use with a stroller or retractable for use with a safety seat.

* * * * *